United States Patent
Oh et al.

(10) Patent No.: US 9,660,259 B2
(45) Date of Patent: May 23, 2017

(54) POSITIVE ELECTRODE ACTIVE MATERIAL WITH IMPROVED OUTPUT AND LITHIUM SECONDARY BATTERY COMPRISING THE SAME

(71) Applicant: LG Chem, Ltd., Seoul (KR)

(72) Inventors: Song Taek Oh, Daejeon (KR); Jung Hwan Park, Daejeon (KR); Geun Chang Chung, Daejeon (KR); Su Hwan Kim, Daejeon (KR); Juichi Arai, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 14/266,113

(22) Filed: Apr. 30, 2014

(65) Prior Publication Data

US 2014/0231720 A1 Aug. 21, 2014

Related U.S. Application Data

(63) Continuation of application No. PCT/KR2013/003306, filed on Apr. 18, 2013.

(30) Foreign Application Priority Data

Apr. 23, 2012 (KR) .................. 10-2012-0042072

(51) Int. Cl.
*H01M 4/505* (2010.01)
*H01M 4/525* (2010.01)
(Continued)

(52) U.S. Cl.
CPC .......... *H01M 4/364* (2013.01); *H01M 4/505* (2013.01); *H01M 4/525* (2013.01); *H01M 4/623* (2013.01);
(Continued)

(58) Field of Classification Search
CPC ...... H01M 4/364; H01M 4/625; H01M 4/623; H01M 4/505; H01M 4/525;
(Continued)

(56) References Cited

U.S. PATENT DOCUMENTS

2003/0054250 A1* 3/2003 Kweon ............... H01M 4/131
429/231.1
2007/0254213 A1 11/2007 Best et al.
(Continued)

FOREIGN PATENT DOCUMENTS

JP 2001130914 A 5/2001
JP 2002-175805 A 6/2002
(Continued)

OTHER PUBLICATIONS

Robertson et al. "Low temperature lithium manganese cobalt oxide spinels, Li4-xMn5-2xCo3xO12 (0≤x ≤1), for use as cathode materials in rechargeable lithium batteries". Journal of Power Sources, 97-98 (2001) 332-335. Dec. 30, 2000. Total pp. 4.*
(Continued)

*Primary Examiner* — Harold Pyon
*Assistant Examiner* — Danny N Kang
(74) *Attorney, Agent, or Firm* — Lerner, David, Littenberg, Krumholz & Mentlik, LLP

(57) ABSTRACT

A mixed positive electrode active material comprising a lithium manganese oxide represented by following [Chemical Formula 1] and a second positive electrode active material represented by following [Chemical Formula 2], and a lithium secondary battery comprising the same are disclosed.

$aLi_2MnO_3 \cdot (1-a)Li_xMO_2$ [Chemical Formula 1]

In [Chemical Formula 1], 0<a<1, 0.9≤x≤1.2, and M is at least one element selected from the group consisting of Al, Mg, Mn, Ni, Co, Cr, V and Fe.

$Li_{4-x}Mn_{5-2x-y}Co_{3x}M_yO_{12}$ [Chemical Formula 2]

In [Chemical Formula 2], 0<x<1.5, 0≤y<0.5, and M is at least one of transition metal elements.

(Continued)

By comprising Mn-rich and Co-doped $Li_4Mn_5O_{12}$, a rapid output decrease at a low SOC section may be relaxed to enlarge an available SOC section. Improved output may be obtained throughout an entire SOC section when compared with a case using pure $Li_4Mn_5O_{12}$.

14 Claims, 3 Drawing Sheets

(51) Int. Cl.
    *H01M 4/36*     (2006.01)
    *H01M 4/62*     (2006.01)
    *H01M 10/0525*     (2010.01)

(52) U.S. Cl.
    CPC ........ *H01M 4/625* (2013.01); *H01M 10/0525* (2013.01); *H01M 2220/20* (2013.01); *Y02E 60/122* (2013.01)

(58) Field of Classification Search
    CPC .......... H01M 10/0525; H01M 2220/20; Y02E 60/122; Y02T 10/7011
    USPC ............................................. 252/506, 182.1
    See application file for complete search history.

(56) References Cited

U.S. PATENT DOCUMENTS

| | | |
|---|---|---|
| 2008/0085452 A1 | 4/2008 | Park |
| 2009/0155694 A1 | 6/2009 | Park |
| 2011/0311869 A1* | 12/2011 | Oh et al. ................. 429/211 |
| 2011/0311872 A1 | 12/2011 | Oh et al. |
| 2012/0315544 A1 | 12/2012 | Yasuda et al. |

FOREIGN PATENT DOCUMENTS

| | | |
|---|---|---|
| JP | 2003100290 A | 4/2003 |
| KR | 1019990049248 | 7/1999 |
| KR | 20070001118 A | 1/2007 |
| KR | 20080031616 A | 4/2008 |
| KR | 20090006897 A | 1/2009 |
| KR | 20110097718 A | 8/2011 |
| KR | 20110097719 A | 8/2011 |
| WO | 2011111364 A1 | 9/2011 |

OTHER PUBLICATIONS

Extended European Search Report for Application No. 13781681.5 dated Mar. 27, 2015.
Michael M Thackeray et al: "Advances in manganese-oxide 'composite' electrodes for lithium-ion", Journal of Materials Chemistry, Royal Society of Chemistry, GB, vol. 15, Mar. 10, 2005 (Mar. 10, 2005), pp. 2257-2267, XP007903619.
International Search Report for Application No. PCT/KR2013/003306 dated Jul. 8, 2013.
Robertson, A. D. et al. "Low temperature lithium manganese cobalt oxide spinels, Li4-xMn5-2xCo3x012 (0< x <1), for use as cathode materials in rechargeable lithium batteries" Journal of Power Sources, Jul. 2001, vol. 97-98, pp. 333-335.
J. Gao, et al, "Eliminating the irreversible capacity loss of high capacity layered Li[Li0.2Mn0.54Ni0.13Co0.13]O2 cathode by blending with other lithium insertion hosts." Journal of Power Sources, Jun. 15, 2009, vol. 191, No. 2, p. 644-647.

* cited by examiner

POSITIVE ELECTRODE ACTIVE MATERIAL WITH IMPROVED OUTPUT AND LITHIUM SECONDARY BATTERY COMPRISING THE SAME

CROSS-REFERENCE TO RELATED APPLICATIONS

This application is a continuation of International Application No. PCT/KR2013/003306 filed on Apr. 18, 2013, which claims priority form Korean Patent Application No. 10-2012-0042072 filed with Korean Intellectual Property Office on Apr. 23, 2012, the entire contents of which are incorporated herein by reference.

BACKGROUND OF THE INVENTION

Field of the Invention

The present invention relates to a positive electrode active material with improved output and a lithium secondary battery comprising the same, and more particularly, to a mixed positive electrode active material relaxing a rapid output decrease in a low SOC section to widen an available SOC section by blending Mn-rich and Co-doped $Li_4Mn_5O_{12}$, and providing further improved output when compared with a case using pure $Li_4Mn_5O_{12}$, and a lithium secondary battery comprising the same.

Description of the Related Art

Recently, lithium secondary batteries are used in many fields including portable electronic devices such as cellular phones, PDAs, laptop computers, and the like. Particularly, according to the increase on environmental problems, researches on the lithium secondary batteries having a high energy density and a high discharge voltage are actively conducted as a driving source of electric vehicles capable of replacing vehicles using fossil fuel which is one of the main factors on atmospheric contamination, such as gasoline vehicles and diesel vehicles, and some of the batteries are at a commercialization step. In order to use the lithium secondary batteries as the driving source in the electric vehicles, a high output and a stable output in a state of charge (SOC) is required to be maintained.

Electric vehicles are classified into a typical electric vehicle (EV), a battery electric vehicle (BEV), a hybrid electric vehicle (HEV), a plug-in hybrid electric vehicle (PHEV) and the like.

The HEV is a vehicle obtaining a driving force from the combination of a common internal-combustion (engine) and an electric battery. The driving is mainly accomplished through the engine, and the battery assists the deficient output of the engine when a greater output is required than a common case as driving an uphill road, etc. During the stop of the vehicle, the battery is charged to recover the SOC again. That is, the main driving source for the HEV is the engine, and the battery is an assisting driving source and is intermittently used.

The PHEV is a vehicle obtaining a driving force from the combination of an engine and a rechargeable battery connected to an external power supply, and is mainly classified into a parallel type PHEV and a series type PHEV.

In the parallel type PHEV, the engine and the battery have an equal relation as the driving sources. The engine and the battery operate alternately as the main driving source according to the circumstances. When the engine is the main driving source, the battery assists the deficient output of the engine, and when the battery is the main driving source, the engine assists the deficient output of the battery. Thus, the engine and the battery work in parallel.

However, the series type PHEV is basically driven by the battery only, and the engine only performs the charging of the battery. Different from the HEV or the parallel type PHEV, the series type PHEV entirely depends on the battery instead of the engine for the driving of the vehicles. Thus, in order to achieve a vehicle running stability, the maintenance of a stable output according to the battery properties in the using SOC section is a relatively significant factor when comparing with other kinds of the electric vehicles, likewise for the EV.

Meanwhile, as the positive electrode material of a high capacity lithium secondary battery, a commonly used representative positive electrode material, $LiCoO_2$ has a practical limitation on the increase of the energy density and the output properties. Particularly when $LiCoO_2$ is used in high energy density fields, structural deformation at a high temperature charge state due to a structural instability may be induced, and oxygen may be generated to make an exothermic reaction with an electrolyte in the battery to cause a battery explosion. In order to improve the safety of $LiCoO_2$, the use of lithium containing manganese oxides such as $LiMnO_2$ having a lamella crystalline structure, $LiMn_2O_4$ having a spinel crystalline structure, etc. and lithium-containing nickel oxide ($LiNiO_2$) has been considered. Recently, researches on lithium manganese oxides obtained by adding a relatively large amount of Mn as an essential transition metal than other transition metals (excluding lithium) into lithium manganese oxides having a lamellar structure (hereinafter, will be referred to as "Mn-rich"), are conducted a lot as a high capacity material.

The Mn-rich has a high output in a high SOC section (for example, the SOC section of 50 or over), however, has a rapidly decreasing output at a low SOC section due to the increase of resistance. Thus, the positive electrode material of the lithium secondary battery used in the series type PHEV or EV has a limitation in application. The defects may be illustrated even when mixing a positive electrode active material having a higher operating voltage than the Mn-rich because only the Mn-rich operates in the low SOC section.

The above-described point is a main obstacle in applying the high capacity Mn-rich in fields requiring good output properties such as electric vehicles. Particularly, different from an HEV using an engine as a main operating source and a parallel type PHEV using an engine and a battery as equal operating sources, the series type PHEV or the EV using only a battery in operating vehicles may be used only in an SOC section maintaining a required output or over. When the Mn-rich is used alone as the positive electrode active material, the output in a low SOC section may be deteriorated, and an available SOC section may be largely decreased.

In order to solve the above-described defects, a method of blending a material having an operating voltage of about 3 V, for example, $Li_4Mn_5O_{12}$, with the Mn-rich may be considered. However, since $Li_4Mn_5O_{12}$ has a large polarization loss and relatively inferior rate properties, a satisfactory output increase with the Mn-rich may not be expected even though performing the blending with the Mn-rich.

Therefore, developments on Mn-rich positive electrode materials maintaining an output in a low SOC section to enlarge an available SOC section and exhibit a high output required in electric vehicles and medium-large size devices are urgent.

PRIOR ART

Patent Literature

Korean Laid-open Patent Publication No. 10-2009-0006897

SUMMARY OF THE INVENTION

The present invention is contrived to solve the above-described requirements and defects. The inventors of the present invention conducted an in-depth study and diverse experiments and developed a mixed positive electrode active material capable of maintaining an output to a certain degree or over in an entire SOC section without a rapid output decrease during charging/discharging, and illustrating a high output.

An object of the present invention is to provide a mixed positive electrode active material capable of maintaining an output to a certain degree or over in an entire SOC section without a rapid output change during charging/discharging, and illustrating a high output.

Another object of the present invention is to provide a lithium secondary battery comprising the mixed positive electrode active material.

DETAILED DESCRIPTION OF THE PREFERRED EMBODIMENT

To achieve these and other advantages and in accordance with the purpose of the present invention, as embodied and broadly described, there is provided a mixed positive electrode active material comprising a lithium manganese oxide (Mn-rich) represented by the following [Chemical Formula 1] and a second positive electrode active material represented by the following [Chemical Formula 2].

  [Chemical Formula 1]

In [Chemical Formula 1], 0<a<1, 0.9≤x≤1.2 (preferably, x=1), and M is at least one element selected from the group consisting of Al, Mg, Mn, Ni, Co, Cr, V and Fe.

  [Chemical Formula 2]

In [Chemical Formula 2], 0<x<1.5 (preferably, 0.1≤x≤0.5), 0≤y<0.5 (preferably, y=0), and M is at least one of transition metal elements. In a typical embodiment, $Li_{4-x}Mn_{5-2x}Co_{3x}O_{12}$ when y=0 may be illustrated.

In addition, the amount of the second positive electrode active material may be 10 to 30 parts by weight based on 100 parts by weight of the total amount of the mixed positive electrode active material.

In addition, the mixed positive electrode active material may further comprise a conductive material and a binder besides the lithium manganese oxide and the second positive electrode active material.

In addition, the conductive material may be graphite or conductive carbon.

In addition, the amount of the conductive material may be 0.5 to 15 parts by weight based on 100 parts by weight of the total amount of the mixed positive electrode active material.

The conductive carbon comprises a carbon black, a material having a crystalline structure of graphene or graphite or mixture thereof. The carbon black is at least one material selected from the group consisting of acetylene black, ketjen black, channel black, furnace black, lamp black, and thermal black.

The binder is one or more selected from a group consisting of vinylidene fluoride-hexafluoropropylene copolymer (PVDF-co-HFP), polyvinylidene fluoride (PVDF), polyacrylonitrile, polymethyl methacrylate, polyvinylalcohol, polyvinylpyrrolidone, polyethylene, tetrafluoroethylene, polypropylene, polyacrylic acid and polytetrafluoroethylene (PTFE). The amount of the binder may be 0.5 to 15 parts by weight based on 100 parts by weight of the total amount of the mixed positive electrode active material.

Meanwhile, the mixed positive electrode active material may further comprise at least one lithium-containing metal oxide selected from the group consisting of lithium cobalt oxides, lithium nickel oxides, lithium manganese oxides, lithium cobalt-nickel oxides, lithium cobalt-manganese oxides, lithium manganese-nickel oxides, lithium cobalt-nickel-manganese oxides, and substituted or doped oxides thereof by other element(s).

The other element may be at least one selected from the group consisting of Al, Mg, Ni, Co, Fe, Cr, V, Ti, Cu, B, Ca, Zn, Zr, Nb, Mo, Sr, Sb, W and Bi.

The lithium-containing metal oxide may be comprised by 50 parts by weight or less based on 100 parts by weight of the mixed positive electrode active material.

There is also provided in the present invention, a positive electrode comprising the mixed positive electrode active material.

In addition, there is provided in the present invention, a lithium secondary battery comprising the positive electrode.

Particularly, an output of the lithium secondary battery in an SOC section of 10 to 40% is 20% or over when compared with an output in an SOC section of 50%.

Meanwhile, the lithium secondary battery is used in a plug-in hybrid electric vehicle (PHEV) or an electric vehicle (EV).

According to the present invention, there is provided the mixed positive electrode active material comprising a high capacity lithium manganese oxide and a second positive electrode active material obtained by partially doping (or substituting) Co into $Li_4Mn_5O_{12}$. As a result, the output decrease due to the rapid resistance increase of the lithium manganese oxide in a low SOC section may be complemented by the second positive electrode active material, and the stability of a cell may be improved. Thus, a high capacity lithium secondary battery having an enlarged available SOC section and improved output properties when compared with a battery using pure $Li_4Mn_5O_{12}$ may be provided.

DETAILED DESCRIPTION OF THE PREFERRED EMBODIMENT

Figure 1:
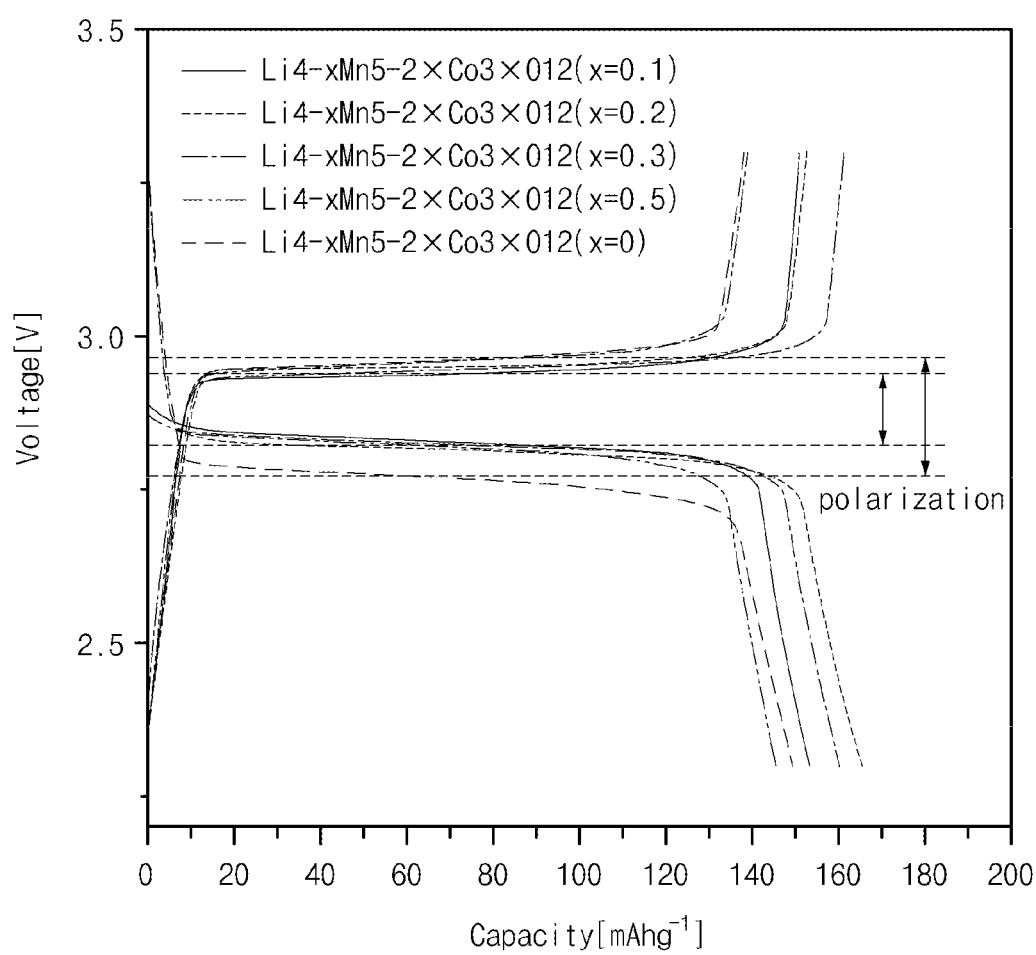
FIG. 1 is a graph on voltage-current profiles illustrating the polarity loss of each battery using pure-$Li_4Mn_5O_{12}$ and Co-doped $Li_4Mn_5O_{12}$.

Hereinafter, the present invention will be described in detail.

The present invention considering the above-described technical problems, provides, a positive electrode active material comprising a lithium manganese oxide (Mn-rich) having a lamellar structure and represented by the following

[Chemical Formula 1] and a second positive electrode active material having a lower operating voltage range than the Mn-rich.

$$aLi_2MnO_3 \cdot (1-a)Li_xMO_2 \quad \text{[Chemical Formula 1]}$$

In the [Chemical Formula 1], 0<a<1, 0.9≤x≤1.2 (preferably, x=1), M is at least one element selected from the group consisting of Al, Mg, Mn, Ni, Co, Cr, V and Fe.

The lithium manganese oxide (Mn-rich) having the lamellar structure and represented by the [Chemical Formula 1] comprises Mn as an essential transition metal, and the amount of the Mn is greater than the amount of other metals excluding lithium. The Mn-rich is a kind of lithium transition metal oxides illustrating a large capacity when overcharged at a high voltage.

In addition, the Mn-rich may provide lithium ions consumed for an initial irreversible reaction at the surface of a negative electrode. During discharging, the lithium ions not used in the irreversible reaction at the negative electrode may migrate to a positive electrode to provide an additional lithium source.

The amount of the Mn comprised in the lithium manganese oxide having the lamellar structure, as an essential transition metal may be greater than other metals (excluding lithium), and may be preferably 50 to 80 mol % based on the total amount of the metals excluding lithium.

When the amount of the Mn is too small, the stability may be deteriorated, the manufacturing cost may be increased, and the illustration of the peculiar properties of the Mn-rich may become difficult. On the contrary, when the amount of the Mn is too large, cycle stability may be deteriorated.

In addition, the Mn-rich has a flat level of a certain section at an oxidation/reduction potential greater than that illustrated by the change of the oxidation number of constituting components in the positive electrode active material. Particularly, the flat level may be illustrated at 4.5 V to 4.8 V when overcharged at a high voltage of 4.5 V or over with the reference of a positive electrode potential.

Even though the Mn-rich has a high output in the high SOC section as described above, the output may be rapidly decreased according to the resistance increase in the low SOC section. Due to the defects, the use of the Mn-rich alone in a lithium secondary battery for a series type PHEV or an EV may cause some limitations. The limitation may be also generated when a positive electrode active material having a higher operating voltage than the Mn-rich is mixed because only the Mn-rich may operate in the low SOC section.

In order to solve the defects, example embodiments provide a mixed positive electrode active material obtained by mixing the Mn-rich with a material having a somewhat lower operating voltage than the Mn-rich as a second positive electrode active material.

The second positive electrode active material is mixed to assist the output decrease of the Mn-rich in a low SOC section and is required to be a positive electrode active material having a flat level at a lower voltage than that of the terminal region of the operating voltage of the Mn-rich.

Preferably, the second positive electrode active material may have a flat level voltage profile in a region of 2.3 V to 3.3 V, more preferably, in a region of 2.5 V to 3.3 V, and most preferably, in a region of 2.8 V to 3.3 V.

As the result, in the low SOC section of the Mn-rich, 2.3 V to 3.3 V, the second positive electrode active material other than the Mn-rich gets involved in the absorption and desorption of Li to complement the low output of the Mn-rich and to provide a lithium secondary battery having an enlarge available SOC section.

When the second positive electrode active material is mixed with the Mn-rich, the content of Mn-rich may be decreased by the fraction of the second positive electrode active material in the mixed positive electrode active material. Thus, the output of the mixed positive electrode active material may be somewhat lowered compared to the battery using the Mn-rich alone at a high SOC section.

However, for lithium secondary batteries used in a series type PHEV, an EV, and the like, a lithium secondary battery capable of maintaining the output of 2.3 V or over in an SOC section as wide as possible is necessary instead of a secondary battery illustrating a high capacity at a specific voltage of a limited range. Therefore, a mixed positive electrode active material and a lithium secondary battery according to the present invention may be appropriate for an operating device requiring a state having an output greater than a certain level without a rapid output decrease over an entire SOC section, for example, a series type PHEV and an EV, however, the use is not limited to the vehicles.

Particularly, the second positive electrode active material according to the present invention is represented by the following [Chemical Formula 2].

$$aLi_{4-x}Mn_{5-2x-y}Co_{3x}M_yO_{12} \quad \text{[Chemical Formula 2]}$$

In [Chemical Formula 2], 0<x<1.5 (preferably, 0.1≤x≤0.5), 0≤y<0.5 (preferably, y=0), and M is one of transition metal element, or two or more transition metal elements applicable at the same time.

$Li_4Mn_5O_{12}$ is a lithium manganese oxide having a cubic symmetrical structure and has one of stoichiometric spinel structure such as a cation arrangement structure of $Li[Li_{0.33}Mn_{1.67}]O_4$. The theoretical capacity of $Li_4Mn_5O_{12}$ is relatively high and 163 mAh/g.

When the $Li_4Mn_5O_{12}$ is used as the electrode active material of a lithium secondary battery, the following electrochemical reaction may be illustrated during charging/discharging.

$$Li_{4+x}Mn_5O_{12} \underset{\underset{\ominus}{\text{Discharge}}}{\overset{\text{Charge}}{\rightleftarrows}} Li_4Mn_5O_{12} + xLi^+ + xe^-$$

(0 ≤ x ≤ 3)

In this case, a Jahn-Teller distortion phenomenon is illustrated only when x is 2.5 in the $Li_{4+x}Mn_5O_{12}$, for example $Li_{6.5}Mn_5O_{12}$. When x=3, for example $Li_7Mn_5O_{12}$, which is a completely charged rock salt state with lithium, the Jahn-Teller distortion effect may be weak when compared with that for $Li_2Mn_2O_4$.

As described above, the $Li_{4+x}Mn_5O_{12}$ is capable of maintaining the cubic balance of an electrode in the region of 3 V to 4 V and has an effect of selecting diverse spinel compositions.

Figure 2:
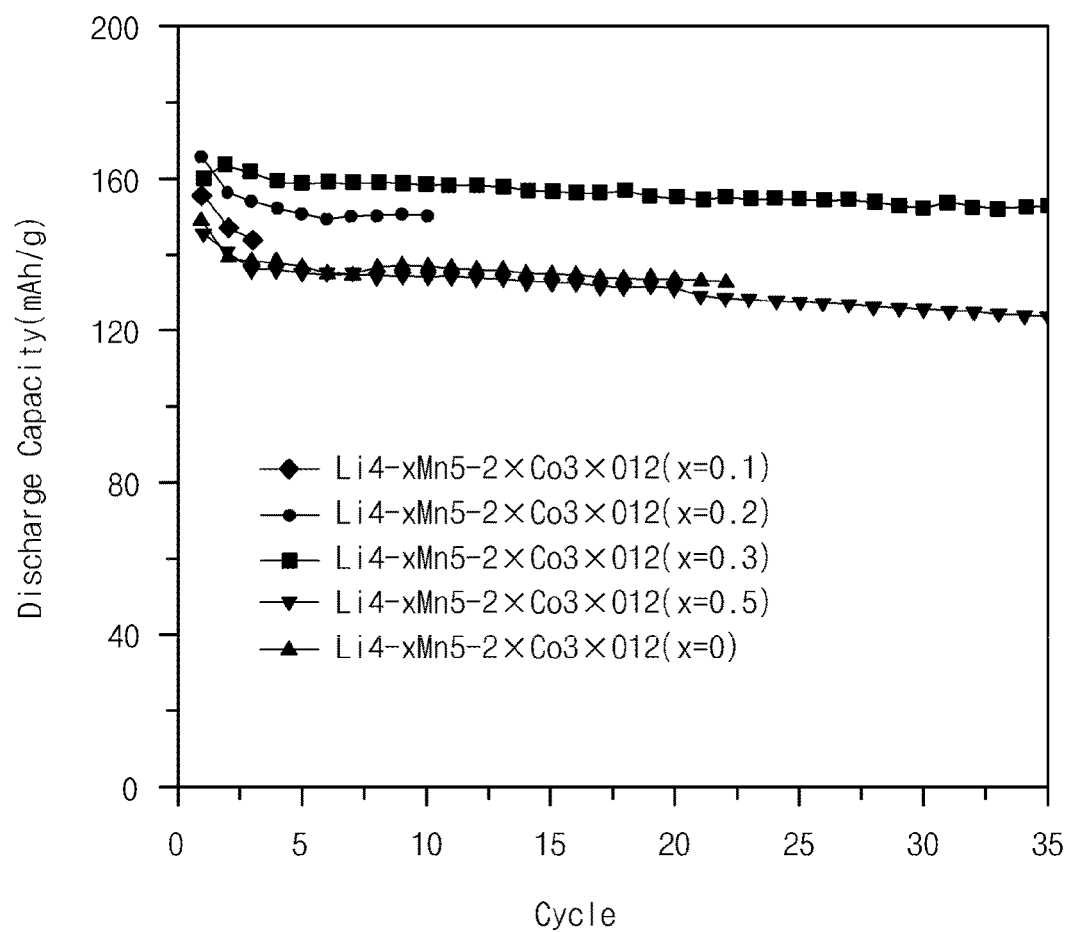
FIG. 2 is a graph illustrating cycle properties of each battery using pure-$Li_4Mn_5O_{12}$ and Co-doped $Li_4Mn_5O_{12}$.

When the $Li_4Mn_5O_{12}$ is used as the positive electrode active material, a polarization loss may be large and rate properties may be deteriorated. Thus, in example embodiments, Co-doped $Li_4Mn_5O_{12}$ is used instead of pure-$Li_4Mn_5O_{12}$ as the second positive electrode active material to be mixed with the Mn-rich. In this case, the polarization loss may be remarkably decreased when compared with the case using the pure-$Li_4Mn_5O_{12}$ (see FIG. 1), and the same level of cycle properties such as the pure-$Li_4Mn_5O_{12}$ may be illustrated. In addition, the capacity may be further increased and rate properties may be improved (see FIG. 2) to increase the output of a cell.

That is, the rapid output deterioration (that is, resistance increase) in a low SOC section possibly generated when using the Mn-rich alone may be prevented, and a higher output may be achieved when the Co-doped $Li_4Mn_5O_{12}$ is blended when compared with the case of blending with pure-$Li_4Mn_5O_{12}$.

Methods for forming the mixed positive electrode material by mixing the Mn-rich and the second positive electrode active material are not limited, and diverse methods known in the art may be applied.

The second positive electrode active material may be comprised by 10 to 30 parts by weight, and preferably, 10 to 20 parts by weight based on 100 parts by weight of the mixed positive electrode material. When the amount of the second positive electrode active material exceeds 30 parts by weight, the achievement of the high energy of the lithium secondary battery may become difficult. When the amount of the second positive electrode active material is less than 10 parts by weight, the amount of the second positive electrode active material is too small, and the achievement in assisting the output in the low SOC section, and the improvement of stability and the output may become difficult.

In addition, when forming the mixed positive electrode active material of the Mn-rich and the second positive electrode active material, problems possibly generated due to the difference of the particle sizes and (specific) surface areas of both materials are necessary to be considered.

Particularly, the difference of the particle sizes or the (specific) surface areas of two or more positive electrode active materials mixed according to the present invention, may be limited within a certain range, or an appropriate conductivity system considering the above factors may be applied. Through homogenizing the particle sizes as described above, the conductive material may be uniformly dispersed without being concentrated on one side, thereby further improving the conductivity of the mixed positive electrode material.

In example embodiments, the Mn-rich and the second positive electrode active material may be treated appropriately to make the sizes of the both materials similar. In a preferred embodiment, one of both positive electrode active materials having smaller particle size may be sintered to agglomerate to obtain secondary particles so that the particle size may become uniform as the relatively large particles of the other positive electrode active material.

In this case, the sintering and the manufacture of the secondary particles may be conducted by known methods in the art without limitation.

As described above, the particle size or the shape of the two or more positive electrode active materials be uniform. As the result, the invention can prevent the conductive material from being concentrically coated on the cathode active material having a larger (specific) surface area only. Further, it can prevent deterioration of conductivity of the other conductive materials wherein relatively less conductive materials are distributed. Therefore, the conductivity of the mixed positive electrode material may be largely increased.

In order to decrease the difference of the particle size or the specific surface area of two or more positive electrode active materials, a method of enlarging the positive electrode active material having a relatively small particle size to form the secondary particles, a method of decreasing the positive electrode active material having a relatively large particle size, or a method of applying the two methods may be used.

Then, the mixed positive electrode material may comprise two or more conductive materials having different particle sizes or shapes. The method of comprising the conductive material is not specifically limited however, any commonly known methods in the art including coating onto a positive electrode active material may be selected. As described above, the inclusion of the conductive materials having different particle sizes is for preventing the concentration of the conductive material to one side due to the particle size difference of the mixed positive electrode active materials. In a preferred embodiment, the conductive material comprises graphite and conductive carbon at the same time.

Through coating the graphite and the conductive carbon having different particle sizes and shapes as the conductive materials on the mixed positive electrode material at the same time, the defects concerning the conductivity decrease of the entire positive electrode active material or the low output due to the difference of the particle size or the surface area between the Mn-rich and the second positive electrode active material may be effectively solved. At the same time, a high capacity mixed positive electrode active material having a wide available SOC section may be provided.

The graphite and the conductive carbon may comprise any materials that have good electric conductivity and do not induce a side reaction in a lithium secondary battery or a chemical change of the battery.

Particularly, the graphite may comprise natural graphite, synthetic graphite, and the like without limitation, and the conductive carbon may comprise carbon-based materials having a high conductivity comprising a mixture of at least one carbon black selected from the group consisting of acetylene black, ketjen black, channel black, furnace black, lamp black, and thermal black and a material having a crystalline structure of graphene or graphite. According to the circumstances, a conductive polymer having a high conductivity may be used.

Here, the amount of the conductive material comprising the graphite and the conductive carbon is preferably 0.5 to 15 parts by weight based on 100 parts by weight of the mixed positive electrode material. When the amount of the conductive material is too small and less than 0.5 parts by weight, the above-described effects may be unexpected. When the amount of the conductive material is too large and exceeds 15 parts by weight, the relative amount of the positive electrode active material may become relatively small, and the accomplishment of a high capacity or a high energy density may be difficult.

In this case, the amount of the conductive carbon may be 1 to 13 parts by weight and preferably, 3 to 10 parts by weight based on 100 parts by weight of the mixed positive electrode material.

In addition, In addition, the mixed positive electrode active material may further comprise at least one binder selected from a group consisting of vinylidene fluoride-hexafluoropropylene copolymer (PVDF-co-HFP), polyvinylidene fluoride (PVDF), polyacrylonitrile, polymethyl methacrylate, polyvinylalcohol, polyvinylpyrrolidone, polyethylene, tetrafluoroethylene, polypropylene, polyacrylic acid and polytetrafluoroethylene (PTFE). The amount of the binder is preferably 0.5 to 15 parts by weight based on 100 parts by weight of the total amount of the mixed positive electrode active material.

In addition, the mixed positive electrode active material may further comprise at least one lithium-containing metal oxide selected from the group consisting of lithium cobalt oxides, lithium nickel oxides, lithium manganese oxides, lithium cobalt-nickel oxides, lithium cobalt-manganese oxides, lithium manganese-nickel oxides, lithium cobalt-nickel-manganese oxides, and a substituted or doped oxides thereof by other element(s). The other element may be at least one selected from the group consisting of Al, Mg, Ni, Co, Fe, Cr, V, Ti, Cu, B, Ca, Zn, Zr, Nb, Mo, Sr, Sb, W and Bi.

In this case, the lithium-containing metal oxide may be comprised by 50 parts by weight or less based on 100 parts by weight of the mixed positive electrode active material.

Meanwhile, the present invention relates to a positive electrode in which the mixed positive electrode material is coated on a collector, and a lithium secondary battery comprising the positive electrode.

Generally, a lithium secondary battery comprises a positive electrode comprising a positive electrode material and a collector, a negative electrode comprising a negative electrode material and a collector, and a separator for blocking the electric contact of the positive electrode and the negative electrode while conducting lithium ions. In the voids of the materials of the electrodes and the separator, an electrolyte for conducting the lithium ions may be comprised.

The positive electrode and the negative electrode may be manufactured by coating a mixture of an electrode active material, a conductive material and a binder on a collector, and drying. A filler may be additionally added to the mixture as occasion demands.

The lithium secondary battery of the present invention may be manufactured by a common method in the art. Particularly, the lithium secondary battery may be manufactured by inserting a porous separator between a positive electrode and a negative electrode and then injecting a non-aqueous electrolyte.

Preferably, the power variation in a certain SOC section may be limited to a certain range to maintain a stable output and to improve the safety in a low SOC section.

In a preferred embodiment, the output in the SOC section of 10 to 40 may be 20% or over when compared with that in the SOC section of 50 for the lithium secondary battery. More preferably, the output in the SOC section of 10 to 40 may be 50% or over when compared with that in the SOC section of 50.

The mixed positive electrode active material, the positive electrode and the lithium secondary battery according to the present invention may be particularly applicable in an operating device requiring the output being maintained at a certain value or over without a rapid output decrease throughout an entire SOC section. The low output properties due to the rapid resistance increase of the Mn-rich at the low SOC section may be complemented by the second positive electrode active material. Since the output may be maintained at a required output or over even at the low SOC (for example, SOC section of 10 to 40), an available SOC section may be enlarged, and the safety may be improved at the same time. Further, the mixed positive electrode active material, the positive electrode and the lithium secondary battery according to the present invention may accomplish higher output than those obtained by blending pure-$Li_4Mn_5O_{12}$.

Hereinafter, the present invention will be described in more detail referring to preferred embodiments.

EXAMPLES

Manufacture of Positive Electrode 90 wt % of a mixture of $0.5Li_2MnO_3 \cdot 0.5LiMn_{1/3}Ni_{1/3}Co_{1/3}O_2$ (Mn-rich, 85 wt %) and $Li_{3.7}Mn_{4.4}Co_{0.9}O_{12}$ (15 wt %), as a positive electrode active material was added with 6 wt % of denka black and 4 wt % of PVDF into NMP to prepare a slurry. The slurry was coated on a positive electrode collector, an aluminum (Al) foil, rolled and dried to manufacture a positive electrode for a lithium secondary battery.

Manufacture of Lithium Secondary Battery

A porous polyethylene separator was inserted between the thus manufactured positive electrode and a graphite-based negative electrode, and a lithium electrolyte was injected to manufacture a polymer type lithium secondary battery.

The formation on the polymer type lithium secondary battery was conducted at 4.6 V, and resistance with respect to SOC was measured by charging/discharging between 4.5 V and 2V (C-rate=1C).

Comparative Example 1

The same procedure was conducted as described in the Example except for using $Li_4Mn_5O_{12}$ instead of $Li_{3.7}Mn_{4.4}Co_{0.9}O_{12}$ as the positive electrode active material.

Comparative Example 2

The same procedure was conducted as described in the Example except for using only $0.5Li_2MnO_3 \cdot 0.5LiMn_{1/3}Ni_{1/3}Co_{1/3}O_2$ (Mn-rich) as the positive electrode active material.

Experiments

Figure 3:
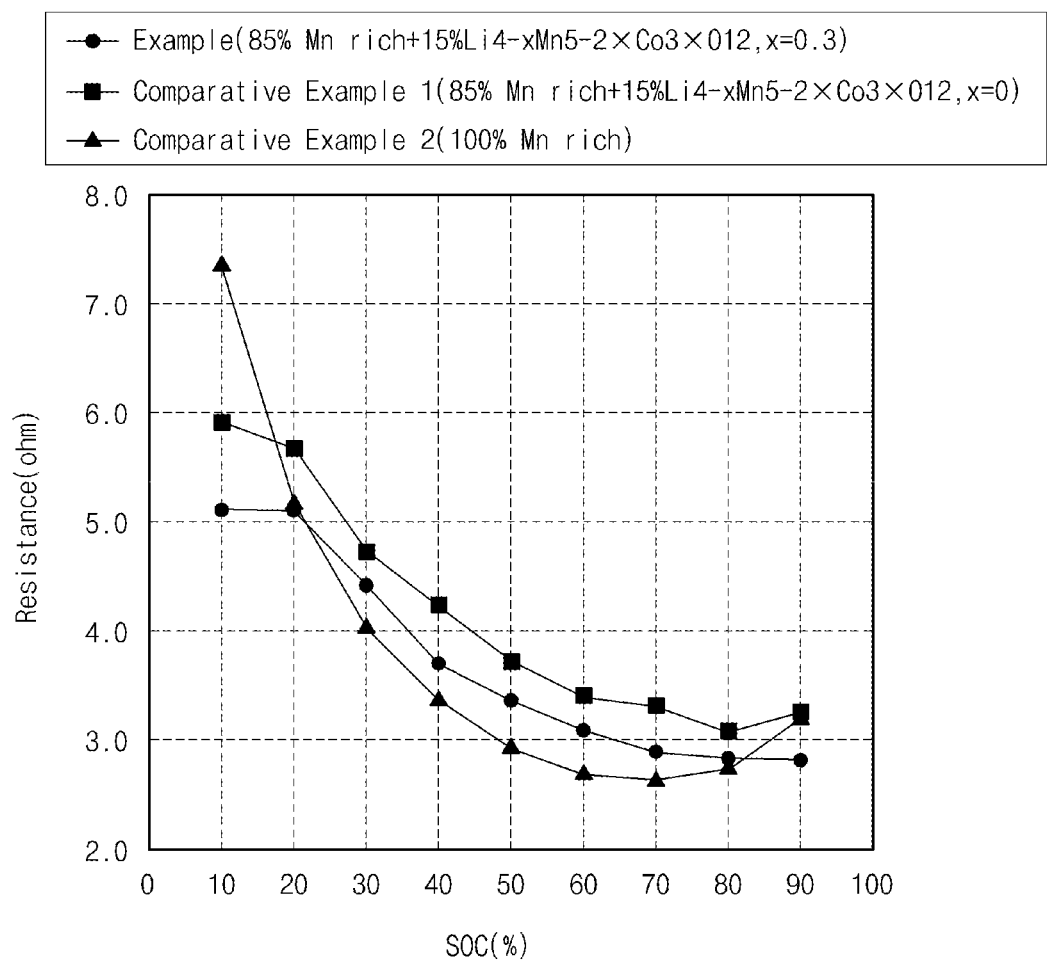
FIG. 3 is a graph illustrating resistance with respect to SOC of each of the lithium secondary batteries according to the Example of the present invention and Comparative Examples 1 and 2.

The resistance change with respect to SOC was measured for full cell lithium secondary batteries manufactured according to the Example and Comparative Examples 1 and 2, and are illustrated in FIG. 3.

Referring to FIG. 3, an available SOC section is quite large without a rapid resistance increase for the battery according to the Example (85% Mn-rich+15% $Li_{3.7}Mn_{4.4}Co_{0.9}O_{12}$) at a low SOC section (SOC section of about 40 to 10% in FIG. 3), and the resistance in an entire SOC section is lower (that is, the output is higher) when compared with that of Comparative Example 1. On the contrary, a relatively slow resistance increase is illustrated in the low SOC section (SOC section of about 40 to 10% in FIG. 3) for the battery according to the Comparative Example 1 (85% Mn-rich+15% $Li_4Mn_5O_{12}$), however, the resistance in the entire SOC section is higher (that is, the output is lower) when compared with that of the Example. Meanwhile, the resistance is rapidly increased, and the available SOC section is narrowed at the low SOC section (SOC section of about 50 to 10% in FIG. 3) for the battery according to Comparative Example 2 (100% Mn-rich). (Data illustrated in FIG. 3 are only for illustration, and particular resistance (or power) values according to the SOC may vary according to the specification of each cell. The tendency of the graph is considered more significant than the particular values.)

According to the present invention, the lithium secondary battery comprises a positive electrode active material of a mixture of a high capacity Mn-rich and Co-doped $Li_4Mn_5O_{12}$. Thus, the low output of the Mn-rich at the low SOC section may be complemented to enlarge the available SOC section, and the output may be increased when compared with a case using pure $Li_4Mn_5O_{12}$.

Although the preferred embodiments of the present invention have been described for illustrative purpose, it should be understood that numerous other modifications and embodiments can be devised by those skilled in the art that will fall within the spirit and scope of the principles of this disclosure. Accordingly, the embodiments of the present invention have been disclosed not for the limitation of the technical spirit but for the explanation, and the protection scope of the present invention should be interpreted by the appended claims and all the technical spirits within the equal range thereof should be included in the present invention.

The invention claimed is:

1. A lithium secondary battery comprising a positive electrode, wherein the positive electrode comprises a mixed positive electrode active material comprising a lithium manganese oxide represented by following [Chemical Formula 1] and a second positive electrode active material represented by following [Chemical Formula 2]:

$$a\, Li_2MnO_3 \cdot (1-a)Li_xMO_2 \qquad \text{Chemical Formula 1}$$

in [Chemical Formula 1], 0<a<1, 0.9<x<1.2, and M is at least one element selected from the group consisting of Al, Mg, Mn, Ni, Co, Cr, V and Fe, $$Li_{4-x}Mn_{5-2x-y}Co_{3x}M_yO_{12} \qquad \text{Chemical Formula 2}$$

in [Chemical Formula 2], 0<x<1.5, 0<y<0.5, and M is at least one of transition metal elements, wherein all outputs in a state of charge section of 10% to 40% are at least about 67% when compared with an output in a state of charge section of 50%.

2. The lithium secondary battery of claim 1, wherein the mixed positive electrode active material comprises the lithium manganese oxide represented by following [Chemical Formula 1] and the second positive electrode active material represented by following [Chemical Formula 2]:

$$a\, Li_2MnO_3 \text{—} (1-a)LiMO_2 \qquad \text{[Chemical Formula 1]}$$

in [Chemical Formula 1], 0<a<1, and M is at least one element selected from the group consisting of Al, Mg, Mn, Ni, Co, Cr, V and Fe, $$Li_{4-x}Mn_{5-2x}Co_{3x}O_{12} \qquad \text{[Chemical Formula 2]}$$

in [Chemical Formula 2], 0.1<x<0.5, wherein particle sizes of the lithium manganese oxide and the second positive electrode active material are uniform.

3. The lithium secondary battery of claim 1, wherein an amount of the second positive electrode active material is 10 to 30 parts by weight based on 100 parts by weight of a total amount of the mixed positive electrode active material.

4. The lithium secondary battery of claim 1, wherein the mixed positive electrode active material further comprises a conductive material and a binder besides the lithium manganese oxide and the second positive electrode active material.

5. The lithium secondary battery of claim 4, wherein the conductive material is graphite or conductive carbon.

6. The lithium secondary battery of claim 4, wherein an amount of the conductive material is 0.5 to 15 parts by weight based on 100 parts by weight of a total amount of the mixed positive electrode active material.

7. The lithium secondary battery of claim 5, wherein the conductive carbon comprises a carbon black selected from the group consisting of acetylene black, ketjen black, channel black, furnace black, lamp black, and thermal black; a material having a crystalline structure of graphene or graphite; and mixture thereof.

8. The lithium secondary battery of claim 1, wherein the mixed positive electrode material further comprises at least one lithium-containing metal oxide selected from the group consisting of lithium cobalt oxides, lithium nickel oxides, lithium manganese oxides, lithium cobalt-nickel oxides, lithium cobalt-manganese oxides, lithium manganese-nickel oxides, lithium cobalt-nickel-manganese oxides, and substituted or doped oxides thereof by other element(s).

9. The lithium secondary battery of claim 8, wherein the other element is at least one selected from the group consisting of Al, Mg, Ni, Co, Fe, Cr, V, Ti, Cu, B, Ca, Zn, Zr, Nb, Mo, Sr, Sb, W and Bi.

10. The lithium secondary battery of claim 8, wherein the lithium-containing metal oxide is comprised by 50 parts by weight or less based on 100 parts by weight of the mixed positive electrode active material.

11. The lithium secondary battery of claim 1, wherein the outputs in a state of charge section of 10% to 40% are from about 67% to about 90% when compared with an output in a state of charge section of 50%.

12. The lithium secondary battery of claim 1, wherein the lithium secondary battery is used in a plug-in hybrid electric vehicle (PHEV).

13. The lithium secondary battery of claim 1, wherein the lithium secondary battery is used in an electric vehicle (EV).

14. The lithium secondary battery of claim 1, wherein the lithium secondary battery maintains a discharge capacity of about 160 mAh/g.

\* \* \* \* \*